United States Patent [19]

Frank

[11] Patent Number: 4,804,916
[45] Date of Patent: Feb. 14, 1989

[54] INPUT VOLTAGE COMPENSATED, MICROPROCESSOR CONTROLLED, POWER REGULATOR

[75] Inventor: Richard W. Frank, Kissimmee, Fla.

[73] Assignee: Timothy Yablonski, Fort Myers, Fla.

[21] Appl. No.: 923,919

[22] Filed: Oct. 28, 1986

[51] Int. Cl.[4] .............................................. G05F 5/02
[52] U.S. Cl. ...................................... 323/300; 307/33; 315/210; 315/307
[58] Field of Search ............... 323/299, 300, 322, 324; 307/31, 33, 34; 315/307, 287, 210

[56] References Cited

U.S. PATENT DOCUMENTS

| | | | |
|---|---|---|---|
| 3,872,374 | 3/1975 | Rasmussen | 323/300 |
| 3,935,530 | 1/1976 | Tanaka et al. | 323/300 |
| 4,289,948 | 9/1981 | Jurek et al. | 323/300 |

FOREIGN PATENT DOCUMENTS

| | | | |
|---|---|---|---|
| 95618 | 6/1984 | Japan | 323/300 |
| 2115240 | 9/1983 | United Kingdom | 307/31 |

Primary Examiner—William H. Beha, Jr.
Attorney, Agent, or Firm—Clement and Ryan

[57] ABSTRACT

A regulating A.C. power controller regulates the selected levels of power to be applied to a plurality of loads by producing a digital signal directly from the A.C. voltage with a pulse duration representative of load power which can be applied as an input to the microprocessor without the need for prior analogue to digital conversion. The load power level is displayed in terms of percentage of power source. Remote control units, such as a computer, can be connected with the power controller to program it for power level settings and warm up time.

1 Claim, 12 Drawing Sheets

FIG. 5
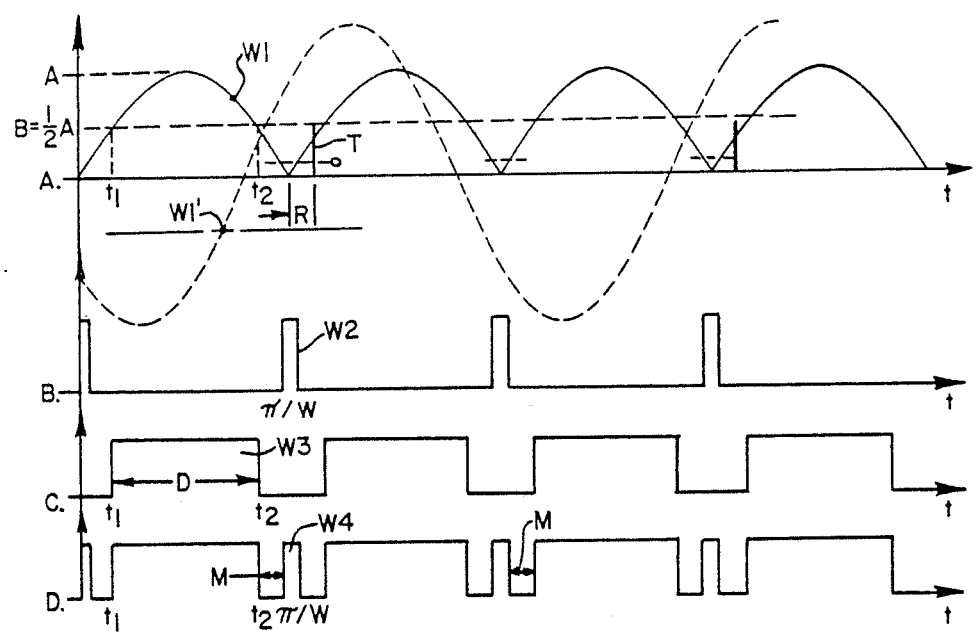
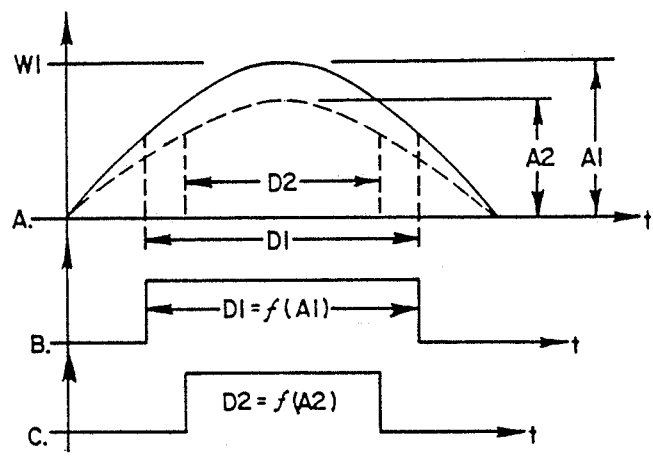
FIG. 6

SAVINGS LAMP CONTROL

INPUT VOLTAGE COMPENSATED, MICROPROCESSOR CONTROLLED, POWER REGULATOR

BACKGROUND OF THE INVENTION

This invention relates to an electronic regulating A.C. power controller. More particularly, it relates to such a controller in which different levels of power are manually selectable and regulated through control of trigger on-time control of an electronic A.C. switch interconnecting the A.C. power source and the load.

A number of A.C. voltage regulator circuits are known in which A.C. power to a lamp or other load is regulated through control of an A.C. electronic switch interconnecting the source of A.C. input power, such as standard 120 VAC, 60 Hz, A.C. line power, and the load. Disadvantageously, in some of these circuits regulation is achieved only through a feedback system connected with the load to sense the load power or voltage across the load. This information is used to advance or retard, during each half wave of A.C. power, the time relative to zero crossing, or phase angle, when the electronic switch is triggered into conduction. If the average voltage across the load increases or decreases, the trigger phase angle is advanced or retarded, respectively, and the portion of each half wave of A.C. input power which is applied to the load through the switch is decreased or increased, respectively. Examples of such circuits are shown in U.S. Pat. Nos. 3,538,427 of Oltendorf; 4,300,075 of Foose et al. and 4,359,670 of Hosaka et al. This general type of feedback regulator is also shown and described in G.E. Application Note 200.35, entitled "Using the Triac for Control of A.C. Power", p. 8, published in July 1970 by the Semiconductor Products Department of General Electric Company, Syracuse, N.Y.

While the circuits function to perform as intended, they have a degree of complexity and cost associated with the load sensing feedback circuit which leads to relatively sluggish response and resultant inaccuracies and increase in costs.

At least some of these problems, however, are overcome in A.C. power regulator of Bandou shown in Japanese Pat. No. 58-106617, published June 25, 1983. In this circuit a microprocessor is employed to eliminate the feedback circuit required in the above A.C. power regulators noted above to reduce the cost, weight, complexity and size of the regulator. This, however, is achieved only at the expense of an analogue to digital converter which converts at least a part, if not all, of each half wave of A.C. input power into digital form. This is used to measure incremental changes reflected in the A.C. input voltage when the power switch is triggered to control the trigger angle of the power switch for regulation purposes. Likewise, in the device shown in U.S. Pat. No. 4,359,670 of Hosaka et al. an analogue to digital converter is required to convert an analogue feedback signal to digital form before it can be applied to a microprocessor used to control the application of load power.

While use of a microprocessor is clearly advantageous over other control devices, analogue to digital converters are relatively expensive and can increase by more than double the electronic component cost of the controller. In U.S. Pat. No. 3,691,452 of Aguiar, a circuit is shown for direct control of load power by a digital signal without the need for an analogue to digital conversion step. Unfortunately, the benefits of a microprocessor are lost in the process and no power regulation is achieved.

SUMMARY OF THE INVENTION

It is therefore the objective of this invention to provide a regulating A.C. power controller which has no negative feedback circuits connected directly with the load to sense load power or voltage and which advantageously employs a microprocessor without the disadvantageous need for expensive analogue to digital converters.

This objective is achieved in part through provision of an improvement to an A.C. power regulator with a power input terminal for connection to a source of A.C. power, an electronic switch interconnecting the source of A.C. power and a power output terminal connectable with a load and means for triggering said switch into conduction. The improvement comprises means responsive to the A.C. power source voltage at said power input terminal for periodically generating a digital load power pulse having a time duration which varies in proportion to the load power and means responsive to the time duration of the load power signal for controlling said triggering means to substantially maintain a selected level of load power despite nominal fluctuations in the source of A.C. power voltage. In the preferred embodiment, the controlling means comprises a microprocessor.

The objective is also achieved, in part, through provision of a regulating A.C. power controller for regulating a selected level of A.C. load power delivered to at least one load from a source of A.C. input power, comprising means for generating a load power signal in response to the A.C. input power voltage magnitude passing through a preselected threshold level substantially equal to one-half the normal peak magnitude of said input power voltage magnitude and means for regulating the selected level of load power in response to said load power signal.

Achievement of this objective is also through provision of a method of controlling the application of power to a plurality of loads for a source of A.C. input power, comprising the steps of selecting a preselected level of power savings for the load, generating a load power regulation signal in response to the time duration of a signal measured, at least in part, by the passage of the A.C. input power source voltage through a preselected threshold, and regulating the portion of each half wave of A.C. power to the load in accordance with said load power regulation signal to substantially maintain the selected level of power savings notwithstanding fluctuation in the magnitude of A.C. input power source voltage.

BRIEF DESCRIPTION OF THE DRAWINGS

The foregoing objects features and advantages will be described in greater detail and additional advantageous features will be made apparent from a detailed description of the preferred embodiment which is given in reference to the several figures of the drawings, in which:

FIGS. 5A, 5B, 5C and 5D are representative waveforms W1, W1' and T; W2; W3 and W4 produced at various points in the circuitry shown in FIGS. 3 and 4B;

FIGS. 6A, 6B and 6C are waveforms illustrating the 45 degree threshold detector;

DETAILED DESCRIPTION

Figure 1:
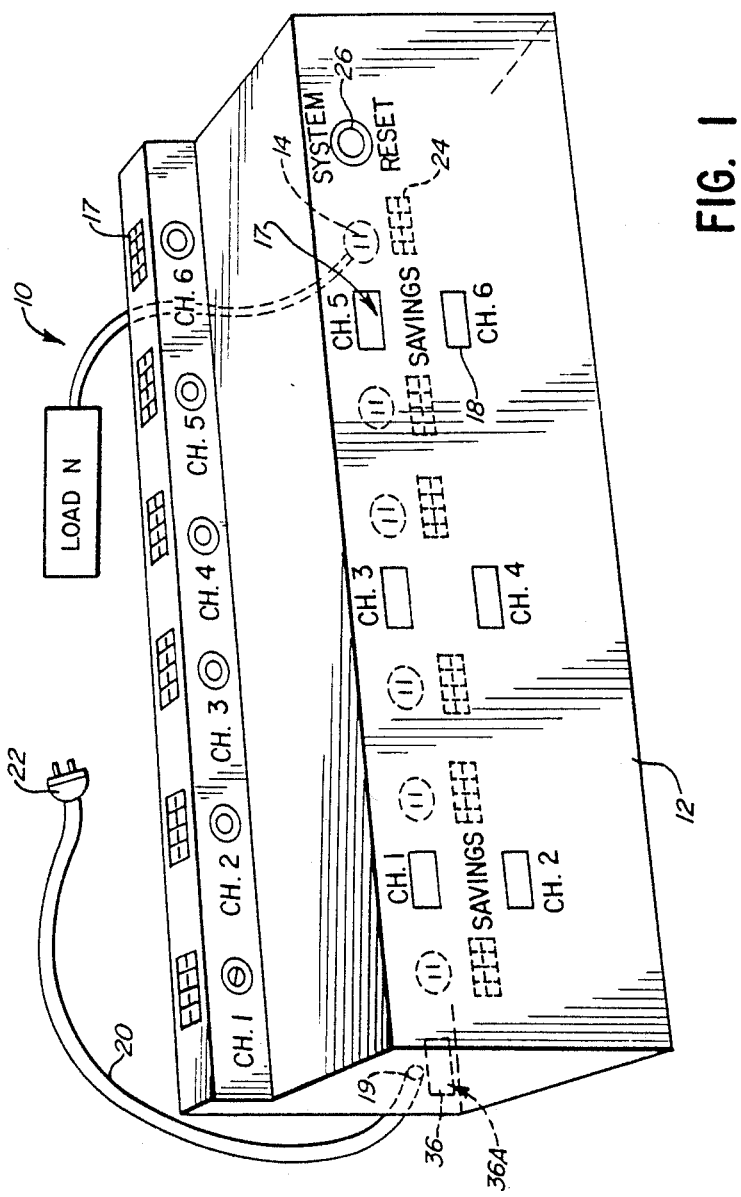
FIG. 1 is a partially perspective, partially schematic illustration of a preferred embodiment of the regulating A.C. power controller of the present invention.

Referring first to FIG. 1, a preferred embodiment 10 of the electronic regulating A.C. power controller is seen to have a housing 12 which protectively encloses the controller circuitry shown in FIGS. 2–6 and described below. Preferably, the controller has N channels for controlling the application of power to N loads, where N is any positive integer greater than one. As seen in the embodiment of FIG. 1, N is the integer six, and there are six substantially identical channels for individually controlling the application of power to six different loads 11, such as load N. Each channel, such as "CHANNEL 6", has associated therewith an output terminal 14, including a releasable, standard-sized A.C. plug receptacle mounted to housing 12, a by-pass switch 16.

When power is being applied to the load at any level reduced relative to full power, then the display element 18 provides a lighted indication of same. The by-pass switches, when actuated, cause the full power to be applied from the A.C. input power terminal directly to the load connected with the output terminal associated with the particular channel being bypassed. When the by-pass switch is not actuated, then the power is limited in accordance with the savings that has been selected for that particular channel. When the by-pass switch is actuated, a light in the back thereof is lit to indicate the by-pass status. Also associated with each channel is a four position "dip" switch which has sixteen composite states associated with sixteen different levels of power savings from approximately 10% to 40%. Whatever power savings has been set, is shown on the display optionally associated with that channel. Selection of power savings for each channel is made through means of a manual power savings selection switches 17 associated with each channel or by means of telemetered information transmitted from a remote master computer or controller connected via a cable 36 to a connector 36A. All the power output terminals 14 ultimately receive their power from conventional A.C. input power circuits of the building in which the controller is located which is provided to the controller at a single power input terminal. Specifically, the power input terminal is connected to the building power circuits or other suitable source of standard A.C. input power 21 through means of an electrical cord 20 and a conventional A.C. plug 22.

One additional switch associated with each channel is a warm-up time delay selection switch 24 which is also preferably in the form of a four position "dip" switch substantially identical to the power savings selection switch 17, but which is used to select warm-up time delay of two to thirty-two minutes in two minute increments during which full power is applied to the load. This is needed since certain types of loads, such as fluorescent lamps, require full power for a period of time before they warm up. After warm-up, only a controlled portion of full power is applied to the load, so power savings can be achieved. The controller 10 of the present invention functions to automatically provide full power for a preselected time period regardless of the selected power savings. After the warm-up time delay has lapsed, however, then the controller functions to gradually reduce the power to the load to the selected level.

Advantageously, through the use of a microprocessor and other space and weight savings approaches in the design, a six channel controller built in accordance with the present invention has a substantially reduced size of approximately 6½ inches by 7½ inches by 23 inches and a weight of only approximately 22 pounds. The housing 12 is also preferably mounted with means for making direct hard wire connection with the loads instead of using releasable connectors.

In the event that A.C. input power drops to a voltage below a preselected level or is temporarily terminated entirely, the controller will function to apply full power to the loads regardless of the preselected power savings for that load so long as the low voltage condition continues. After voltage returns to its normal level, then the controller automatically reverts to its power savings mode of operation. In addition, at any time, such as in the event of power loss, all channels are restartable in response to manual actuation of a master, system reset switch 26.

The controller also includes one or more switches (not shown) for setting the controller to operate at either of two standard nominal voltages or two standard nominal frequencies for A.C. line power, such as nominal voltages of 120 volts and 277 volts and nominal frequencies of 50 Hz and 60 Hz. Sixteen amps of current can be provided to the load at either of these voltages and frequencies irrespective of the input power voltage to the controller. The controller itself can be powered by either 120 or 277 volts A.C. power from source 21.

The nominal voltage as indicated above typically fluctuates over a nominal range of operating voltage of plus or minus approximately ten percent. The controller, however, functions to reduce resultant fluctuation in average voltage to the various loads to no more than plus or minus one percent.

Figure 2:
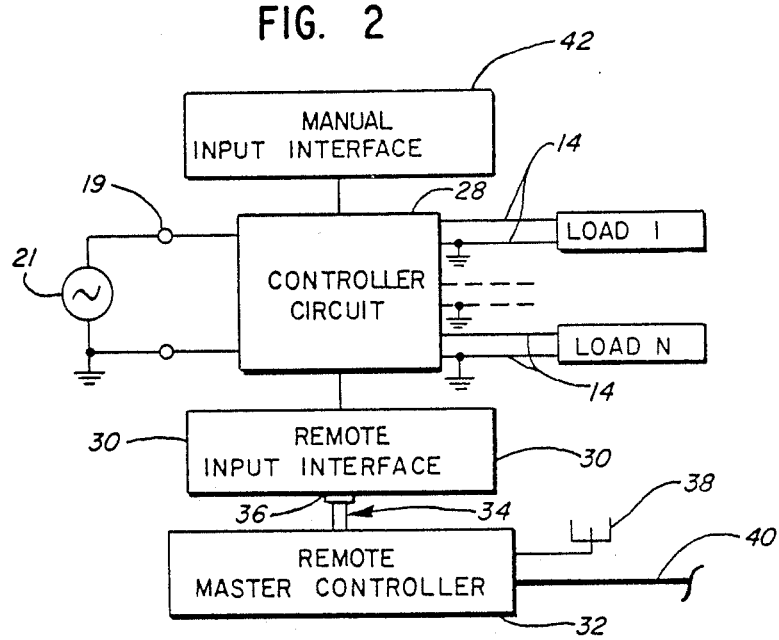
FIG. 2 is a functional block diagram of a preferred embodiment of the regulating A.C. power controller.

Referring now to FIG. 2, contained within housing 12 is a controller circuit 28 which has a remote input interface 30 for interconnecting remote control signals from a remote master controller 32 with the controller circuit 28. In a preferred embodiment, the connection between the remote master controller 32 and the remote input interface 30 is via a communication cable 34 connected to the remote input interface 30 by means of a connector 36.

If provided with remote control capability, then the manual inputs provided to the controller circuit by way of a manual input interface circuit 42 are overridden by communications from the remote master controller 32. Preferably, the communications protocol is RS-232 (three wire) at 300 baud. The package address is established by way of an eight position "dip" switch which provides individual addresses for up to 256 six channel packages. In the event of a loss of communication, each channel will revert to the manual switch settings for control upon a local power-up or reset condition.

Alternatively, another programming method is to provide a portable programming and display unit (not shown) which plugs into the connector 36. In such case, preferably the connector 36 comprises a "D" RS-232C connector. The portable programming unit comprises a key-pad, a time of day clock and calendar and display which serves as a programming entry display to permit entering of the same control parameters otherwise accomplished via entry at a remote master controller 32, as described above. Preferably, when used with the portable programming unit, the controller will, after programming, maintain local time to within one second per day and will maintain time and other programming information by way of a back-up battery to provide power to the memory during power failure conditions. Sixteen or more programming statements per channel are preferably capable of being entered and stored in the controller circuit.

Figure 3:
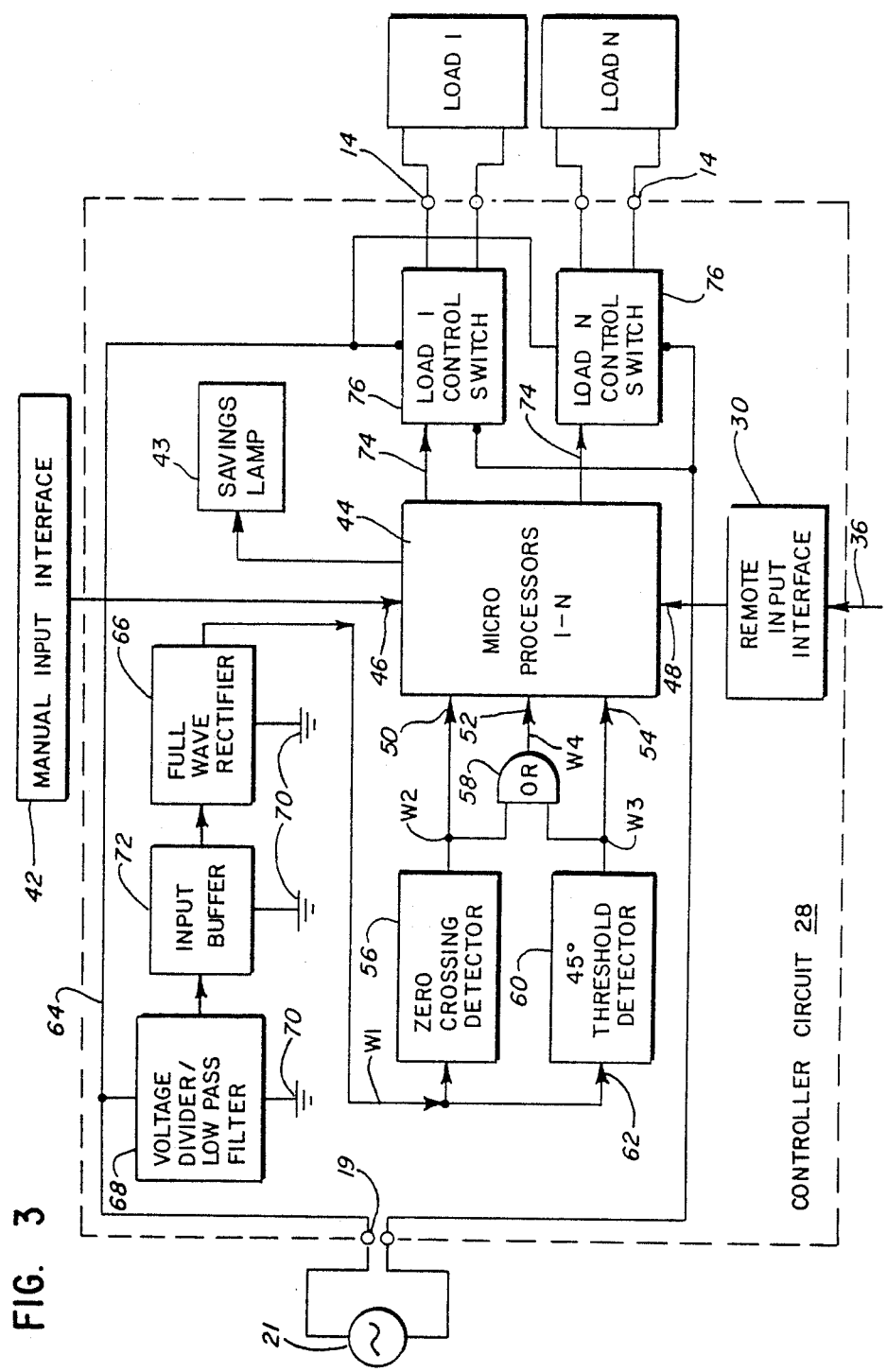
FIG. 3 is a functional block diagram of a preferred embodiment of the control circuit 28 of FIG. 2.

Referring now to FIG. 3, a preferred embodiment of the controller circuit 28 includes a microprocessor 44 for each load 1 through N with suitable inputs 46 connected with the manual input interface 42 and suitable inputs 48 from the remote input interface circuit 30. Each microprocessor 44 responds to the signals at the inputs 46 and 48 to establish the preselected level of savings for the particular load 1 through N associated therewith. In addition, the microprocessor has three inputs 50, 52 and 54 which are respectively coupled to a zero crossing detector 56 and logic OR gate 58 and, most importantly, a 45 degree threshold detector 60. The zero crossing detector 56 produces a waveform W2 shown in FIG. 5B that comprises a narrow pulse generated at the zero crossing of the A.C. power voltage from source 21 which corresponds to the zero voltage points of a waveform W1 shown in FIG. 5A. The waveform W2 is applied both to input 50 of microprocessor 44 and to one of the inputs of OR gate 58. The 45 degree threshold detector 60 also receives the waveform W1 at its input 62 and produces, in response thereto, a waveform W3 shown in FIG. 5C.

This waveform W3 is applied to both input 54 of microprocessor 44 and to the remaining input of OR gate 58. OR gate 58, in turn, disjunctively responds to the waveforms W2 and W3 to produce a waveform W4 which is applied to input 52 of microprocessor 44. The waveform W1 has a magnitude which is directly proportional to the magnitude of the A.C. power source voltage from source 21 which is provided on power bus 64. The waveform W1 is produced on the output of a full wave rectifier 66 which full wave rectifies an A.C. signal produced on a voltage divider/low pass filter circuit 68 which has one input connected to the A.C. voltage bus 64 and its other input connected to a ground reference potential 70. The unrectified A.C. signal produced on the output of voltage divider/low pass filter 68 is coupled to the input of full wave rectifier 66 through an input buffer 72.

The microprocessor 44 responds to the signals at its inputs 46, 48, 50, 52 and 54 to selectively apply trigger signals on its outputs 74 respectively connected to load control switches 76 which are respectively associated with load 1 through load N.

Referring to FIGS. 6A–6C, in keeping with an important aspect of the invention, the waveform W3 of FIG. 5C comprises a load power signal with a digital pulse having a width, or time duration, D which varies in proportion with variations in the peak amplitude A of waveform W1, which, as noted above, is directly proportional to the peak magnitude of the A.C. power source voltage provided at power input terminal 19. As seen in FIGS. 6A, 6B and 6C, when the waveform W1 has a peak magnitude A1, the pulse produced by the approximately 45 degree threshold detector has a width D1, and when the peak amplitude is reduced to a lesser magnitude A2, the pulse is reduced to a duration, D2, which is less than D1. The microprocessor is responsive to the width D of this pulse for controlling the phase angle at which that the trigger signals are applied to the load control switches to substantially maintain the level of load power selected for each of the loads despite nominal fluctuations ($\pm 10\%$) in the A.C. power source voltage.

Referring to FIG. 5A, this load power pulse of waveform W1 is generated from a time t1 occurring when the instantaneous amplitude first exceeds a preselected threshold level B during each halfwave until a time t2 when the instantaneous amplitude decreases below the preselected threshold level B. Advantageously, microprocessors have very high frequency oscillators with frequencies on the order of one million Hertz and, thus, are very good at precisely and directly measuring time duration of the pulse width D of waveform W1. Because of this accuracy of measurement, improved regulation control is achieved relative to a unit in which the control signal must first be converted to digital form before being provided to the microprocessor 44.

Importantly, I have discovered that if the threshold level B is selected to be approximately one-half the nominal peak magnitude A, the width of the pulse closely follows or is directly proportional to the load power over a substantial range of fluctuations of A.C. power source voltage amplitude on the order of plus or minus ten percent. Accordingly, using this pulse duration the on time triggering the load control switches results in an improved regulation of load power without the need for any direct load power or voltage feedback circuits and without the need of expensive analogue to digital converters.

Specifically, the derivative of the pulse duration D with respect to the peak amplitude A equals $2B/\omega A\sqrt{A^2 - B^2}$ seconds/volt. Thus, for value of B approximately equal to $\frac{1}{2}$ A, the duration is approximately directly proportional to load power.

Alternatively, the pulse duration M of the zero state pulse occurring between time T2 and the next zero crossing pulse of waveform W2, which is generated by OR gate 58 as part of waveform W4, can be employed by the microprocessor as a measurement of amplitude. However, in this case, the pulse duration M, instead of being directly proportional to the amplitude, is approximately inversely proportional to the amplitude. Specifically, the duration M is approximately defined by the formula $M=(K-D)/2$ where $K=8.33$ msec. and D equals the duration of the positive pulse of waveform W4.

Figure 4A:
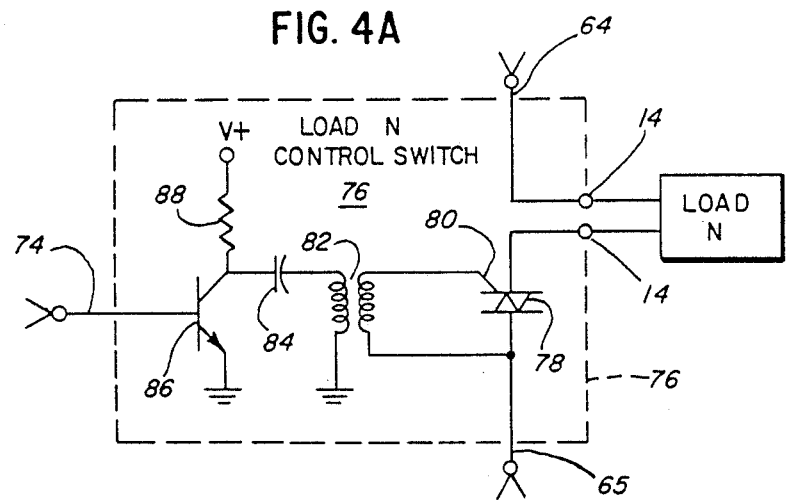
FIG. 4A is a circuit schematic of a preferred embodiment of the functional block of FIG. 3.

Referring now to FIG. 4A, a preferred embodiment of the load control switch 76 is seen to employ a bi-directional thyristor interconnecting the load in series between the positive A.C. power line bus 64 and the neutral power line bus 65 through the transconductive terminals of thyristor 78. Thyristor 78 also has a gate or trigger input terminal 80 which is interconnected through a transformer 82 and an A.C. coupling capacitor 84 to the collector output of an NPN transistor 86. The collector of transistor 86 is connected to a suitable D.C. supply voltage V+ through a load resistor 88.

When the microprocessor generates a positive pulse on its output 74 which is applied to the base of transistor 86, transistor 86 begins to switch to a conductive state. This causes discharge of capacitor 84 and generation of a trigger pulse that causes the thyristor 78 to switch to a conductive state. The thyristor remains in a conductive state even after the trigger signal is removed until the current through its transconductive terminals drops to substantially zero.

Figure 4B:
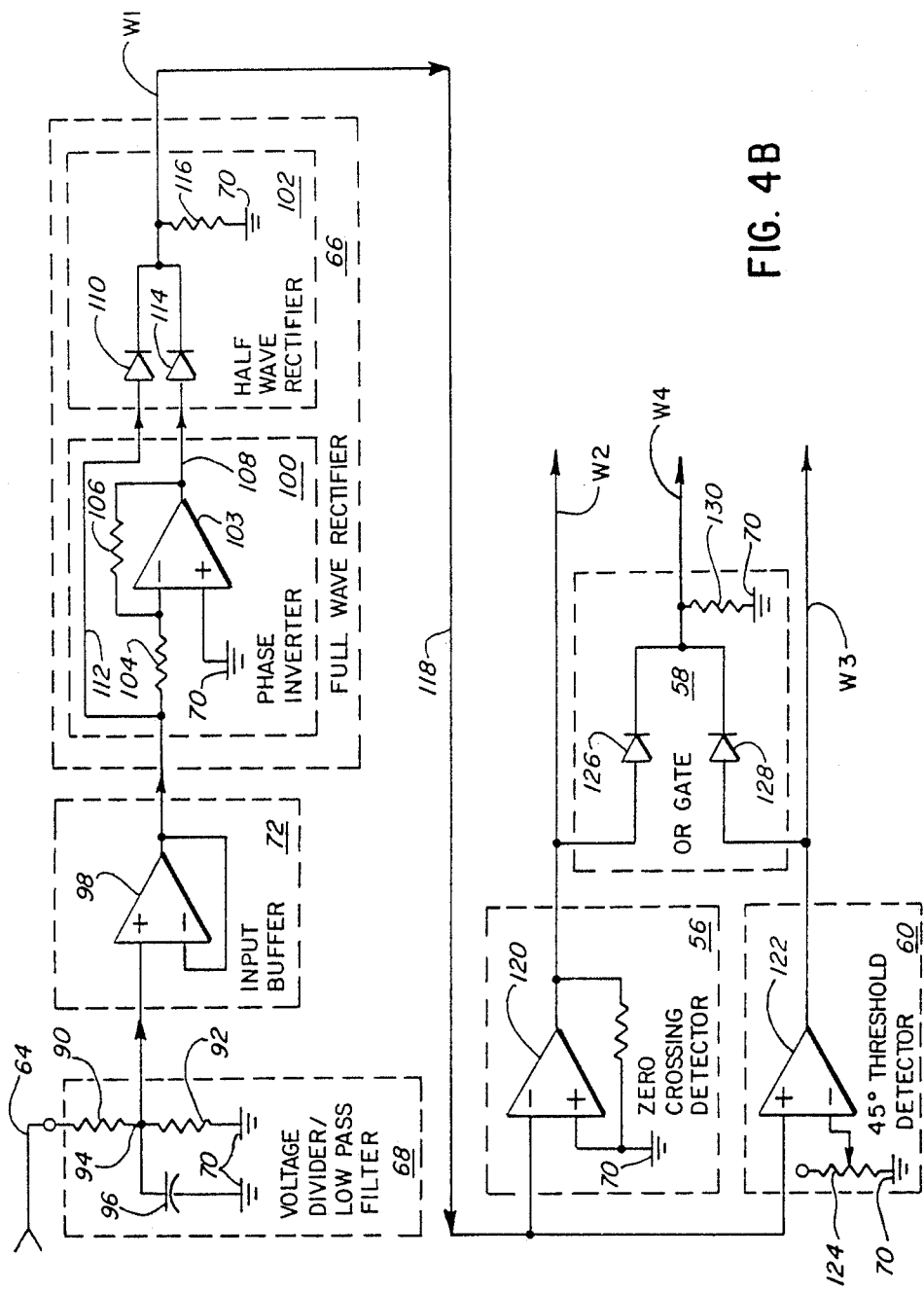
FIG. 4B is a circuit schematic of the preferred embodiments of the voltage divider/low pass filter, input buffer, full wave rectifier, zero crossing detector, 45 degree threshold detector and OR gate functional blocks of FIG. 3.

Referring now to FIG. 4B, preferred embodiments of the voltage divider/low pass filter 68 of the input, the input buffer 72, the full wave rectifier 66, the zero crossing detector 56, the 45 degree threshold detector 60 and the AND gate 58, shown in functional block form in FIG. 3, will be described in detail.

Voltage division is achieved in the voltage divider/low pass filter 68 through a pair of resistors 90 and 92 connected in series between the active A.C. voltage bus 64 and ground reference potential 70. The voltage produced at their juncture is directly proportional to the A.C. power source voltage but is reduced to a signal level appropriate for the subsequent circuitry. The voltage produced at the juncture 94 is filtered by low pass filter capacitor 96 interconnected between the juncture 94 and ground reference potential 70. This simple filter removes higher frequency noise and harmonic distortion which could otherwise interfere with the desired measurement. In addition, this network produces a precise and stable attenuation, and 45 degree phase shift between waveform W1', E/p, the power supply voltage, and voltage produced at the output of full wave rectifier 66 and applied to the remaining detection portion of the cardiac output monitor. It has been established by experiment that the region of power savings for gas discharge lighting fixtures is in the range of 60-90 degree phase delay from the zero-crossings of waveform W1, which is 15-45 degrees from the zero crossings of waveform W' zero crossing period.

The output voltage produced at juncture 94 is coupled to the non-inverting input of an operational amplifier 98 which is a voltage-follower and functions to buffer the input and to provide a low output impedance for the remaining circuitry.

The output of the amplifier 98 is connected to a phase inverter 100 interconnected with a half-wave rectifier 102. The phase inverter 100 is an operational amplifier with an inverting input connected to the output of input buffer 72 through a coupling resistor 104. Negative feedback is provided through a feedback resistor 106 interconnected between its output and the inverting input, and the non-inverting input is connected to ground reference potential 70. In this configuration, the amplifier 103 functions as a precise 180 degree phase inverter which produces an amplitude at its output 108 that is held accurate to within 1% of the magnitude of the voltage applied to its input from the input buffer 72. This precise gain of negative one is established by virtue of the accuracy of resistors 106 and 104. The non-inverting input to amplifier 103 generated by input buffer 72 is connected directly to the input of a first diode 110 of halfwave rectifier 102 through a lead 112. The inverting output of amplifier 103, on the other hand, is connected to another diode 114. The cathodes of diodes 110 and 114 are interconnected together, and accordingly a full wave rectified waveform W1 is produced at their juncture. A bias resistor 116 is connected between the juncture and ground reference potential 70.

The full wave rectified waveform W1 is coupled through a lead 118 to the inputs of both the zero crossing detector 56 and the 45 degree threshold detector 60. The zero crossing detector 56 comprises an operational amplifier 120 having an inverting input connected to lead 118 and a non-inverting input connected to ground reference potential 70. In this configuration, the amplifier 120 functions as an amplitude-comparator, or Schmitt trigger, to detect the negative cusp of waveform W3. When the voltage magnitude decreases to a level substantially equal to zero, a positive zero crossing pulse is produced as shown in waveform FIG. 5B. This pulse continues to be generated until the magnitude again increases above a zero voltage level by a slight amount.

The 45 degree threshold detector 60 also comprises an operational amplifier 122 having its non-inverting input connected to lead 118 and its inverting input connected to ground reference potential 70 through a variable resistor 124. The value of the variable resistor 124 is selected to achieve a threshold level that is approximately equal to one-half of the nominal peak amplitude of the waveform W1. Adjustment is provided so that the power controller can be used with A.C. power sources of different magnitude as noted above. It is referred to as a 45 degree threshold detector, of course, because the 50% amplitude level is reached at the 45 degree phase angle of the sine wave. The variation in the duration of the pulse produced on the output of operational amplifier 122 is proportional to the tangent of the threshold angle.

The OR gate comprises a pair of diodes 126 and 128 having their anodes respectively coupled to the outputs of operational amplifiers 120 and 122 and their cathodes interconnected at the output which is biased to ground reference potential 70 through a resistor 130. Whenever either waveform W2 or W3 are positive, the OR gate 70 output signal W4 is positive.

The variation in the duration of pulse duration D or pulse duration M is used by the microprocessor 44 to control the time that the load control switches are triggered in order to regulate the load power. This is achieved through means of either a look-up table which is stored within the memory of the microprocessor or through means of a calculation.

Figure 7A:
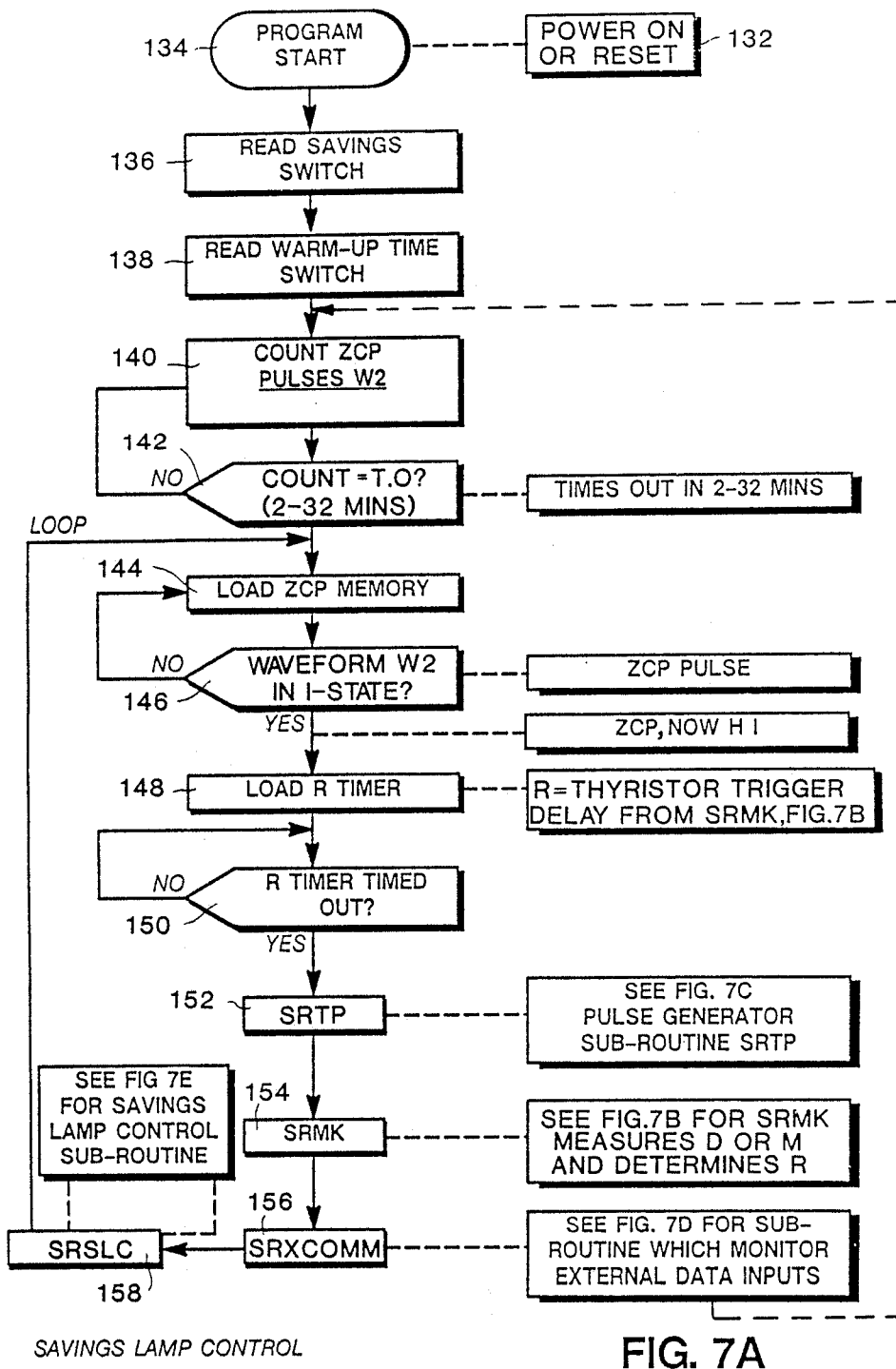
FIG. 7A is a flow chart, or algorithm, of a preferred embodiment of the computer program employed in the microprocessor of FIG. 3 in which the load power pulse duration D of waveform W3 or M of waveform W4 is converted to the trigger control signal T of FIG. 5A via a look-up table.

Referring to the algorithm of FIG. 7A, the computer program employed in the microprocessor, or computer, of FIG. 3 converts the load power pulse duration D of waveform W3 or pulse duration M of waveform W4 to the trigger control signal T of FIG. 5A via a look-up table. For purposes of discussion, it will be presumed that control signal T is derived from measurements of pulse duration D. In any event, as seen, there are two major parts to the program: a set-up portion illustrated by functional box 132, 134, 136, 138, 140 and 142 and a control portion represented by function boxes 144, 146, 148, 150, 152, 154 and 156 and 158. The set up portion starts when power is first applied (or reapplied after a power loss condition) and establishes a warm-up time delay before the control portion is entered. The control portion includes a continuously running real-time loop for power regulation which cycles once for each half cycle of the AC input power line frequency (e.g. once each 8.33 milliseconds for 60 Hz line frequency).

During the set-up portion, the percentage of power savings preselected for each load via the savings selection switches 17 or manual input interface 42 via the remote input interface 30, FIG. 2, is read and stored, as shown by function 136, READ SAVINGS SWITCH. Likewise, the microprocessor reads the setting of the warm-up time delay selection switch 24 as shown by function 138, READ WARM-UP TIME SWITCH. The computer then counts the number of zero crossing pulses of waveform W2, FIG. 5B, as shown by function 140, COUNT ZCP PULSES W2. When the count reads a number which is equivalent to the warm-up time T.0 selected in the range of 2 to 32 minutes, the warm-up period ends and the control portion of the program is entered as shown by the function 142, COUNT=T.0-(2–32 MINS).

The first function performed in the control portion is loading of the zero crossing point into a ZCP memory as shown by function 144, LOAD ZCP MEMORY. As soon as waveform W2 switches to a 1-state at the beginning of each half-wave of AC power, the function 146, WAVEFORM W2 IN 1-STATE?, causes the loading of the thyristor trigger delay obtained from the subroutine SRMK into a timer register as shown by function 148, LOAD R TIMER. Once the time delay R has passed, and the answer to the question of function 150, R TIMER TIMED OUT? is affirmative, a pulse generate sub-routine SRTP, function 152, FIG. 7C, is caused to generate the trigger pulse to the thyristor to apply power to the load.

The sub-routine function 154, SRMK, is entered in order for the microprocessor to make measurements of intervals D or M from which it computes a new value for R the thyristor trigger delay. As shown in detail in FIG. 7B, this delay is loaded into the R timer, or register, of function 148, LOAD R TIMER. The external data inputs, or external communications, are then monitored by sub-routine function 156, SRXCOM shown in detail in FIG. 7D. The sub-routine function 158, SRSLC, is then entered for saving lamp control calculations, as shown in detail in FIG. 7E. The control portion loop is then completed. The program then recycles to the beginning of the control loop and waits for detection of the next zero crossing point, or ZCP pulse.

Figure 7B:
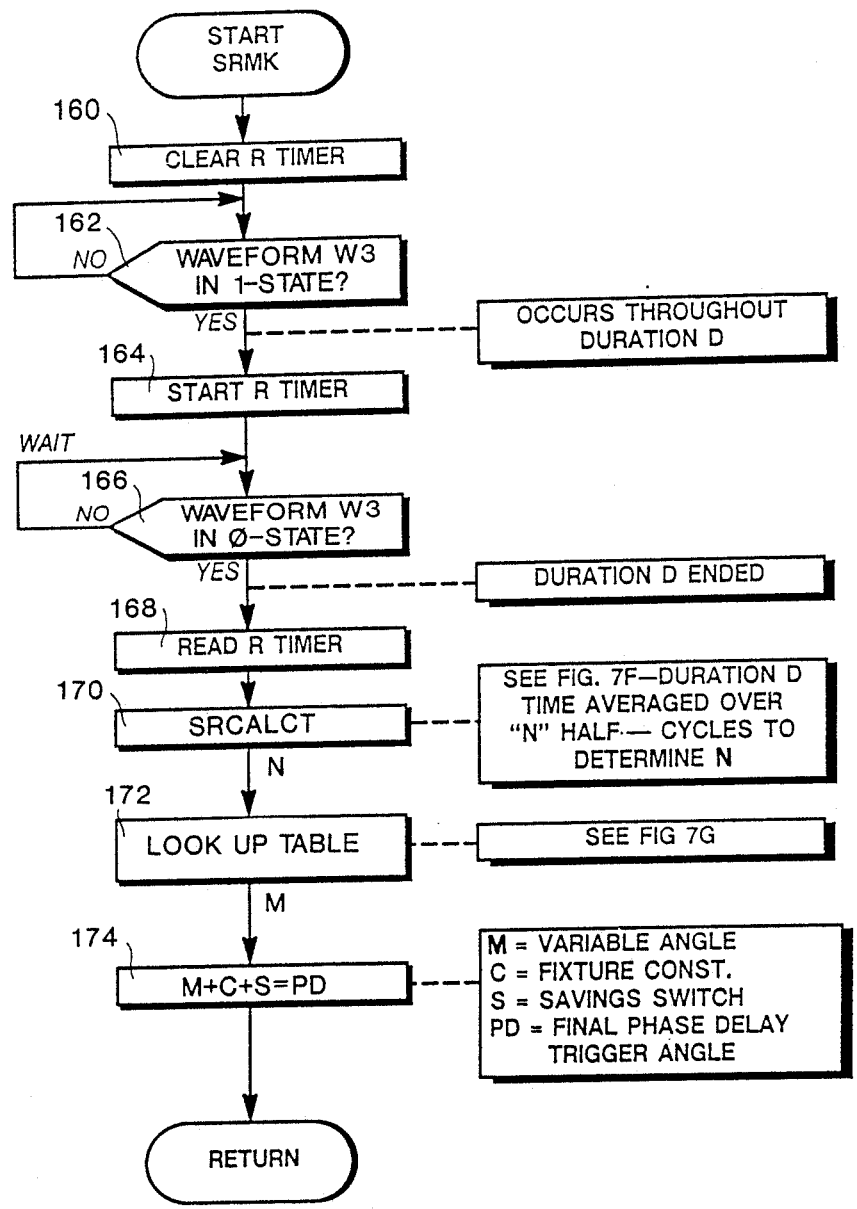
FIG. 7B is a flow chart, or algorithm, of a preferred embodiment of the measurement sub-routine SRMK of FIG. 7A.
Figure 7C:
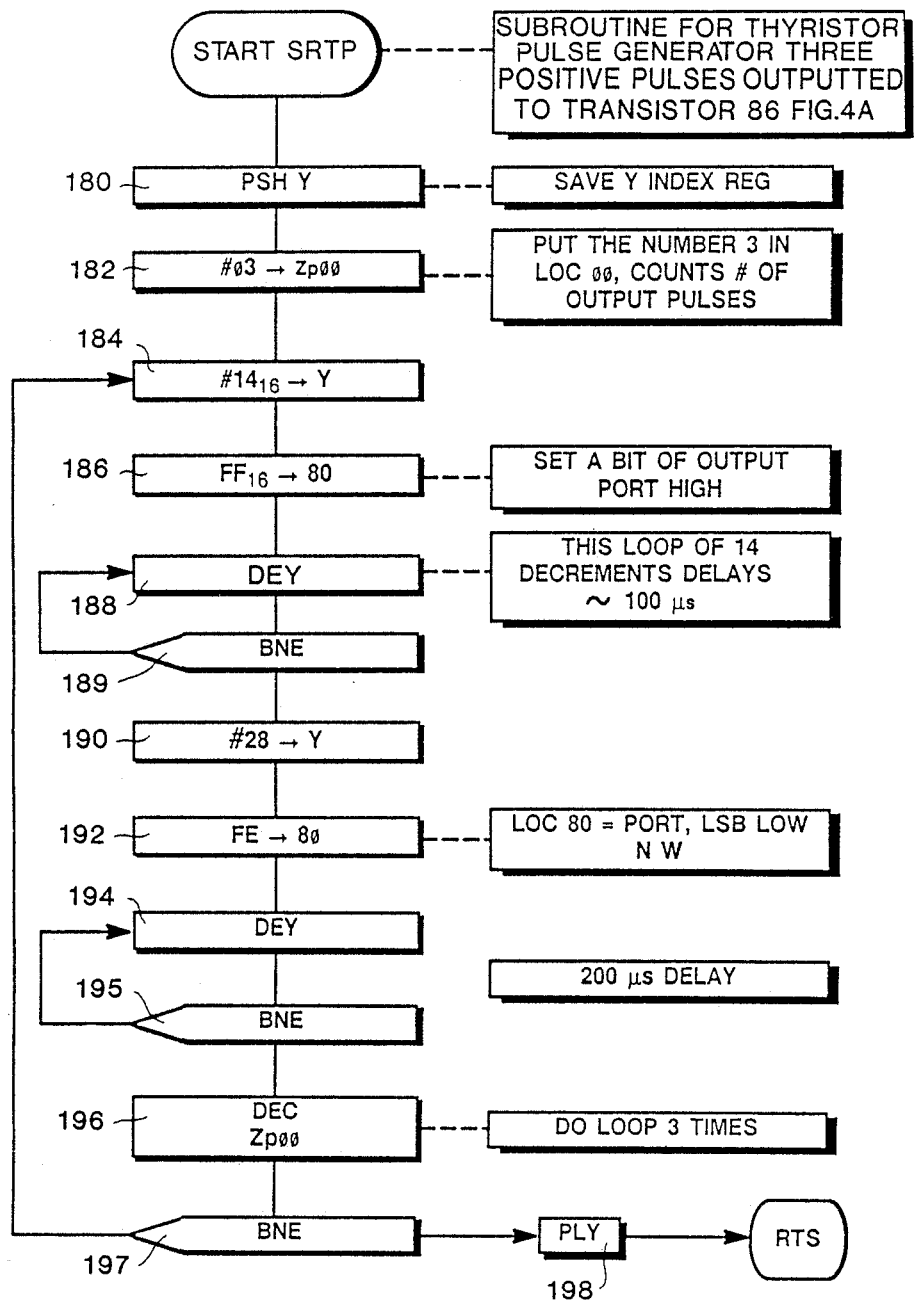
FIGS. 7C through 7G detail important support sub-routines called from the main line programs, and further illustrate the combination of arithmetic calculations and non-linear look-up of data necessary to provide adequate and stable control.

Turning to FIG. 7B, the measurement sub-routine SRMK is seen to begin with the function 160, CLEAR R TIMER, of clearing the R timer, or register, of any trigger delay information. The function 162, WAVEFORM W3 IN 1-STATE?, causes the sub-routine to then look for the positive transition of waveform W3. As soon as this positive transition is detected, the function 164, START R TIMER, causes the sub-routine to start incrementing the R register. This continues until function 166, WAVEFORM W3 IN 0-STATE, senses the negative transition of waveform W3, FIG. 5C. The R register is then read into the appropriate location of a register associated with the sub-routine 170 SRCALCT pursuant to function 168, READ R TIMER. As will be described in greater detail with reference to FIG. 7F, the register of sub-routine 170 SRCALCT stores the data from the R register for each of eight successive half-cycles, and the data from the latest half-cycle replaces that of the oldest half-cycle stored on a first in, first out basis. In this way the data from eight half-cycles are averaged.

The average numeric value of the data from the SRCALCT sub-routine, or N, is passed to an index register where it is then converted via a LOOK UP TABLE program function 172 to a new angle M which has been compensated for the highly-nonlinear characteristics of fluorescent fixtures.

This value M is then added to the preselected fixture constant C and a fixed value S representing the preselected savings as preselected by the savings switch as shown by the program function 174, M+C+S=PD, to produce the phase delay value PD. Once the value PD is determined, the subroutine is ended and returns to the main program in which the value PD is used to set the thyristor time delay in the next half cycle.

Thus, the control loop operates in real time during each half cycle in the first part of the half cycle time, and the trigger time delay is generated by decrementing the register R. The initial value stored in register R is established from the measurements made of line voltage in preceeding loops. When the count in register R has been decremented to zero, the control switch 76, FIG. 3 is triggered on pursuant to the sub-routine SRTP, FIG. 7C. This trigger-on-time will occur generally within the first quarter of the half cycle. The last quarter of each half cycle is devoted to measuring the present value of line-voltage using the measurement sub-routine SRMK, FIG. 7B. After the SRMK sub-routine, the control program enters the communication sub-routine of FIG. 7D and then the savings lamp illumination control sub-routine of FIG. 7E.

Referring to FIG. 7C, the sub-routine SRTP of FIG. 7C generates three 100 microsecond positive pulses at 74 of FIG. 3. On entry to SRTP the Y index register is saved at function 180, PSNY, because it is in use in the main program. It is restored upon exit at function 198, PLY. The number three is placed in a register as shown by function 183, and is the number of pulses to be output. The Y index register is used to time the output pulses, as shown by function 184, it is loaded with the number 14. At the next function program step, 186, output register 80 is loaded to put output 74 of FIG. 3 into a logic 1-state. Y is decremented to zero, as shown by functions 188 and 189, and this occupies a 100 microsecond interval. At the end of this interval Y is reloaded with the number 28 and shown by function 190 and output 74 is set to a logic 0-state by writing $FE_{16}$ to port 80 as shown by function 192. Y is then decremented again to zero as shown by the loop of functions 194 and 195. On exit from this loop, the pulse counter register is decremented as shown by function 196. If not zero upon test at function 197, the loop repeats. Thus three output pulses of 100 microsecond duration and 200 microsecond spacing are produced.

Figure 7D:
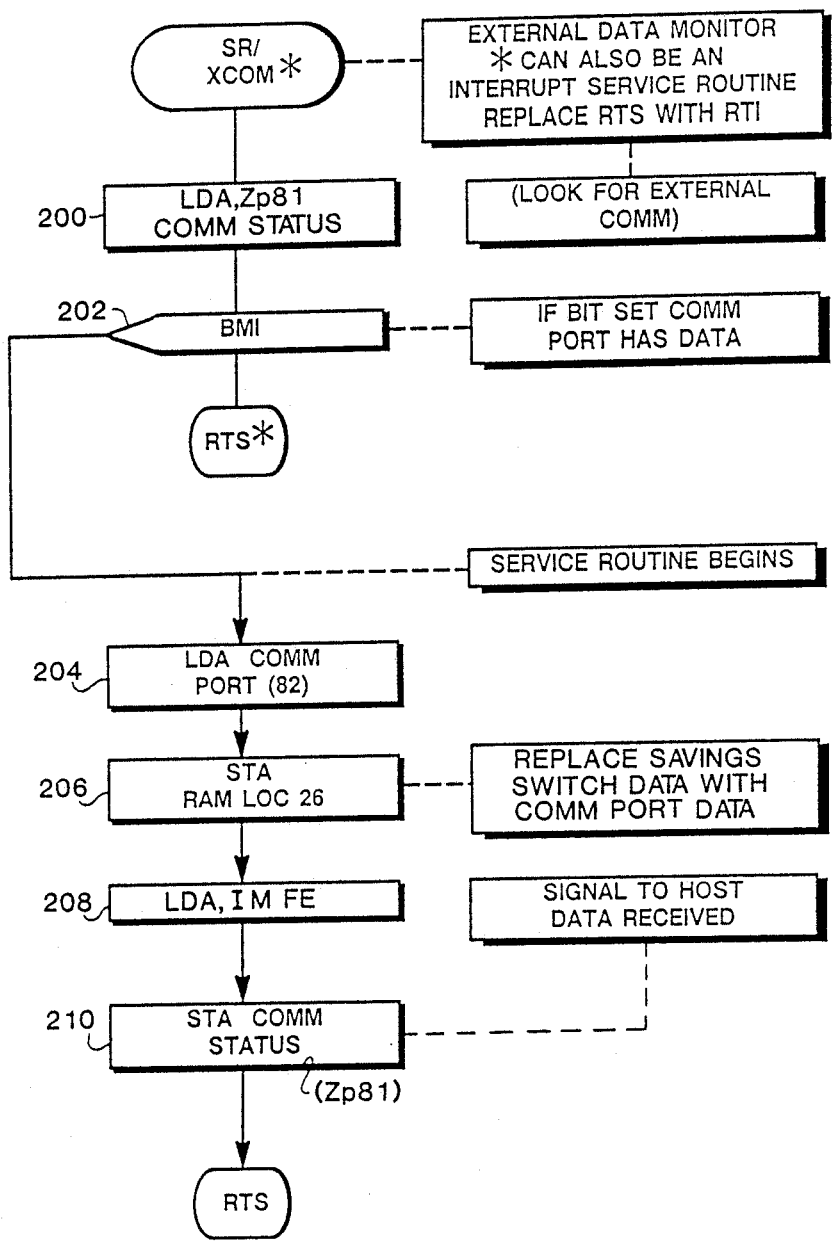

Referring to FIG. 7D, the sub-routine SRXCOM permits the remote master controller 32, FIG. 2, such as another dedicated microprocessor, to communicate with the controller circuit 28 through the remote input interface 30 via a wire communication protocol (e.g. protocol RS-232). This is preferably comprised of a parallel data protocol for a port of eight bits and at least four additional parallel control lines.

Generally, upon entry into the SRXCOM sub-routine, the control data port is read into the controller circuit accumulator. If the value read is zero, the controller circuit exits the sub-routine SRXCOM. If the value is non-zero, the control circuit is caused to read the remote input data port and store this data in, for example, the register controlling savings before returning to the main program at ten. A return port line to the remote master controller 32, FIG. 2, may serve as a data-taken flag.

Specifically, at 156 in FIG. 7A the main program calls subroutine XCOM, or SRXCOM of FIG. 7D. If the external data receiver has placed data on the I/O port 81 Comm Status (200), this data will cause a branch within the subroutine 202. The branch begins at function 204 where the communication port instruction is read. (In this example, the data in the "savings" control register is replaced.) Finally, at function 208 a number is placed in the communication status register $Zp_{81}$ as shown by function 210 which indicates the data has been accepted.

Figure 7E:
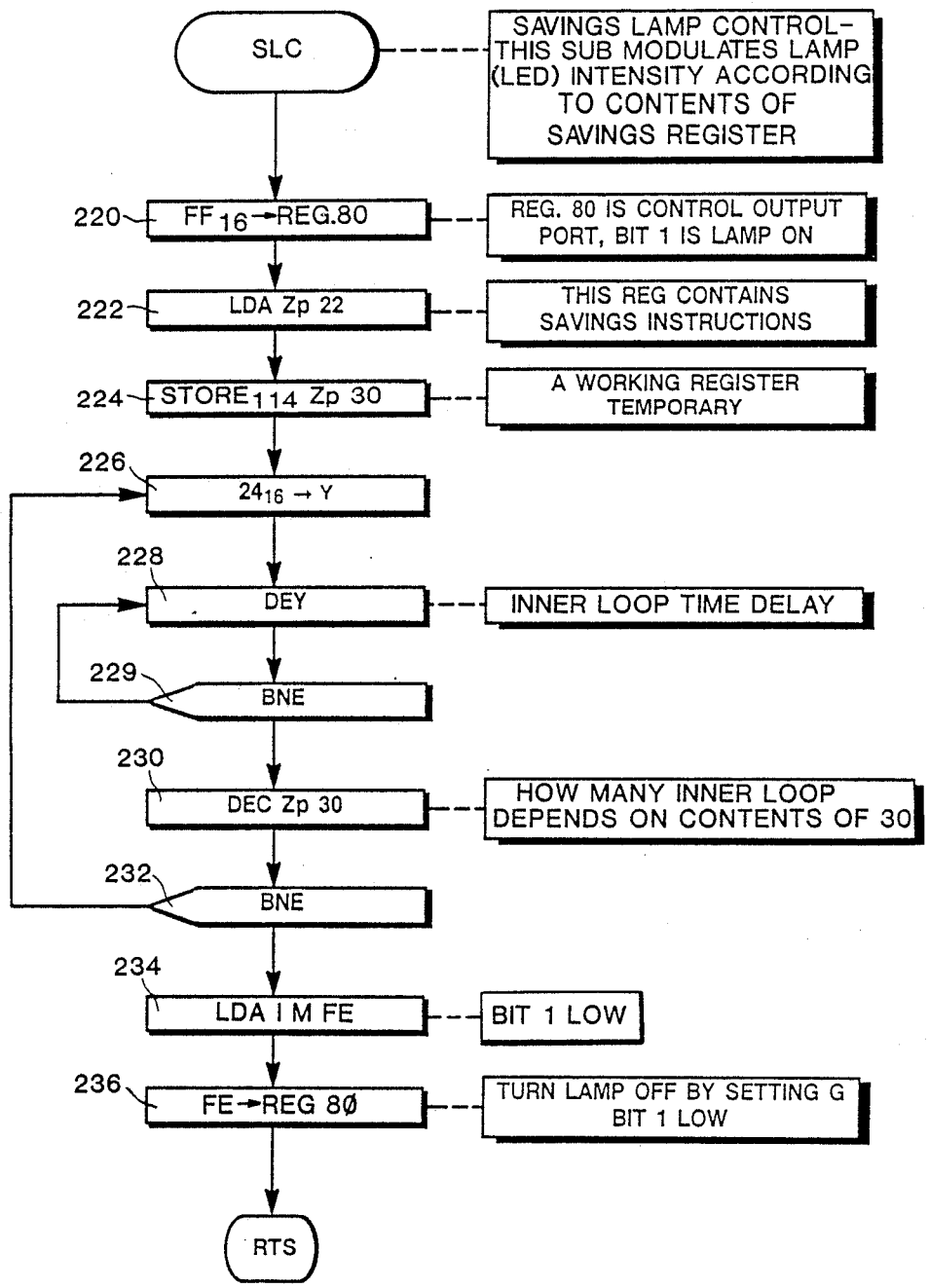

Referring now to FIG. 7E, the sub-routine SLC functions to intensity modulate a light emitting diode, or LED, by duty cycle ratio control when the main control loop of the program is operating. The constants of the savings register 22 is used to control the average on current in the LED.

Generally, the contents of the savings register 24 is transferred by a temporary counter register 30. An inner delay loop is established using the "Y" index register. The counting register 30 is decremented each time the inner loop goes to zero. Thus, the time duration of the asserted signal on the savings lamp drive port connected to the savings lamp 43 of FIG. 3 is thus linearly proportional to the number contained in register 22.

Specifically, the savings lamp 43 is turned on by setting a port wire into a logid 1-state, as shown at 220. This port will be held high for a variable time determined by the contents of the savings register, function 174 of FIG. 7B, referred to here at function 222 as Zp 22. Zp 22 of function 222 is transferred to a temporary register, as shown by function 224, which is later decremented to zero at functions 230 and 232. The decrement rate, established by the Y index register as shown by functions 226, 228 and 229 is identical in principle to the pulse timing of FIG. 7C. After this variable interval, the savings lamp is pulsed off as shown by functions 234 and 236.

Figure 7F:
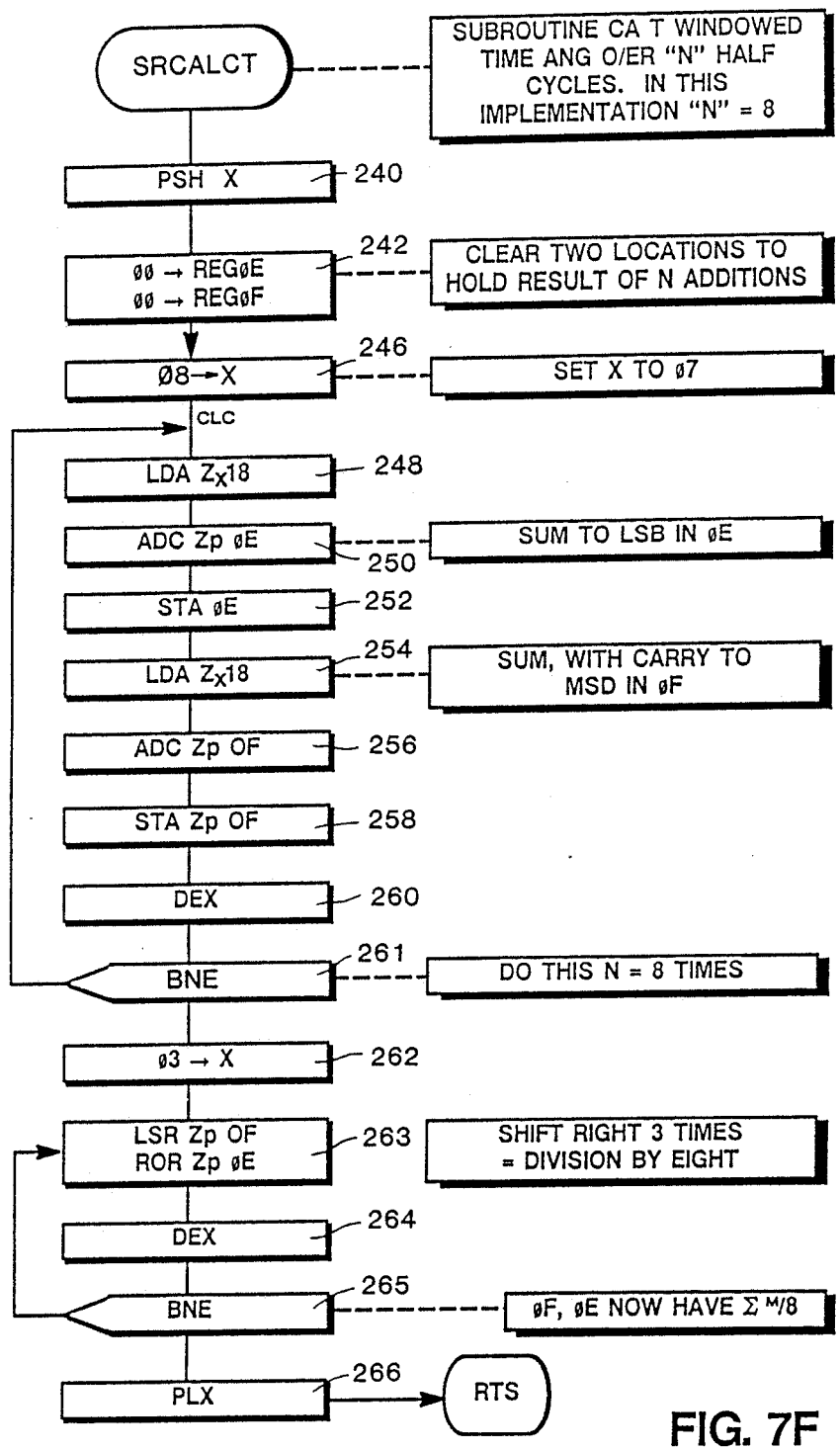

Referring now to FIG. 7F, the sub-routine SRCALCT functions to perform a 16 bit addition of eight numbers corresponding to eight successive microprocessor measurements and then divides this sum by eight to obtain an average value. The number eight is arbitrarily controlled by the number in the X register. The result of the averaging computation is left in locations oE and o F on the global page prior to exiting the sub-routine.

Specifically, the time-duration measurement process illustrated in FIG. 6 produces a number, every half-cycle, which number is placed in eight global page registers 18, 19, . . . etc. These registers are referred to at function 254 of FIG. 7F. The CALCT subroutine will average these eight numbers. Upon entry to the subroutine, the X index register, being used in the main program of FIG. 7A is saved at function 240 and upon exit from the subroutine, this index register will be restored at 266. At function 242 the two registers are cleared to hold the results of the computation of the loop consisting of functions 248, 250, 252, 254, 256, 258, 260 and 261. At function 246 the X index register is set to eight and it is later decremented at function 260 to run the loop of functions 248-261 eight times.

Within this loop, a double precision addition of the eight locations is made with the result stored in Zp oE and Zp oF. After the eight additions, the program exits from the loop at function 261. At functions 262 the X index register is set to the number three. Double precision registers of (MSD) and oE (LSD) are now shifted top the right by the count of X in the loop formed by functions 263, 265 and 266. Three shifts are equivalent to division by eight.

Figure 7G:
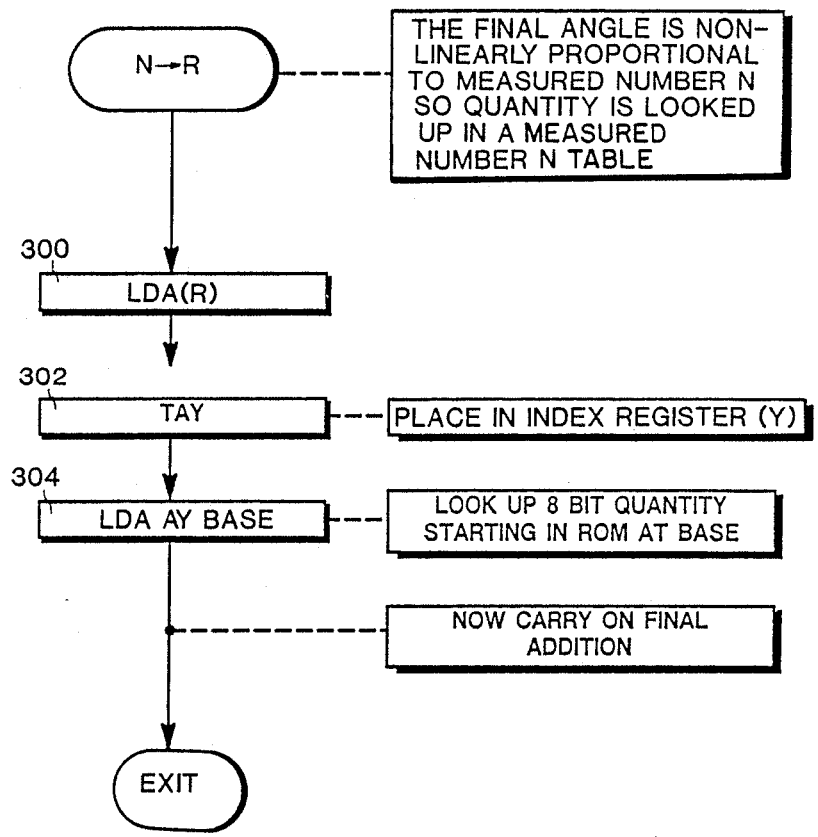

Referring to FIG. 7G, this sub-routine is the conventional method for converting one number of a set, possibly linear, which represents the power, to another number of another set, possibly non-linear, which represents the appropriate phase angle. Presuming the input number is N, then the contents of the register Y will be N. The accumulator is now loaded with the second number from a table starting with a second number from a table starting on memory at the number "BASE". If $N=\phi$ then $Y=\phi$, and the number at BASE is in the accumulator upon exit from the sub-routine. Likewise, if Y is 10, then the number at BASE +10 is in the accumulator upon exiting from the sub-routine.

Specifically, referring to FIG. 7G, it is assumed that the input number is "N" and that "N" is the contents of register R. The accumulator is loaded from R with this number at function 300 and transferred to Y at function 302. At function 304 the accumulator is now loaded from a table of numbers starting at BASE. If the Y index register can hold of eight bit number, then the tube, being at BASE, can be 256 numbers long. The stored numbers can result in any curve shape desired.

While a detailed description of a preferred embodiment of my invention has been described herein, it should be appreciated that many variations may be made with respect thereto without departing from the scope of the invention as defined by the following claims.

I claim:

1. In an A.C. power regulator with a power input terminal for connection to a source of A.C. input power, an electronic triggerable switch interconnecting the source of A.C. power and a power output terminal connectable with a load, and means for triggering said switch into conduction, the improvement comprising:

means responsive to the A.C. power source voltage at said power input terminal for periodically generating a digital load power pulse having a time duration which varies in proportion to the load power.

said digital load -power pulse generating means including means for generating a pulse during whatever time period that the magnitude of the A.C. power source voltage exceeds a preselected threshold voltage and which substantially varies in direct proportion with the load power, said pulse being generated during whatever time period that the input A.C. power voltage magnitude exceeds a threshold magnitude of approximately one half the nominal maximum magnitude of the input A.C. power voltage occurring approximately between the phase angles of 45 degrees and 135 degrees of positive half waves and between 225 degrees and 315 degrees of negative half waves; and means responsive to the time duration of the digital load power pulse for controlling said triggering means to substantially maintain a selected level of load power despite nominal fluctuations in the source of A.C. power voltage, said controlling means including a microprocessor for directly converting said digital pulse into a binary representation of the load power.

* * * * *